US00RE45318E

(19) United States
(12) Reissued Patent
Hatch

(10) Patent Number: US RE45,318 E
(45) Date of Reissued Patent: Jan. 6, 2015

(54) METHOD FOR PROCESSING EXPLOSIVES CONTAINING 2,4,6,8,10,12-HEXANITRO-2,4,6,8,10,12-HEXAAZATETRACYCLO-[5.5.0.0$^{5,9}$0$^{3,11}$]-DODECANE (CL-20) WITH NAPHTHENIC AND PARAFFINIC OILS

(75) Inventor: Robert L. Hatch, Wellsville, UT (US)

(73) Assignee: Alliant Techsystems Inc., Arlington, VA (US)

(21) Appl. No.: 11/437,006

(22) Filed: May 17, 2006

Related U.S. Patent Documents

Reissue of:
(64) Patent No.: 6,736,913
Issued: May 18, 2004
Appl. No.: 10/000,244
Filed: Oct. 18, 2001

U.S. Applications:
(60) Provisional application No. 60/244,193, filed on Oct. 31, 2000.

(51) Int. Cl.
*D03D 23/00* (2006.01)

(52) U.S. Cl.
USPC ..... 149/109.6

(58) Field of Classification Search
USPC ..... 149/109.6
See application file for complete search history.

(56) References Cited

U.S. PATENT DOCUMENTS 3,138,501 A * 6/1964 Wright ..... 149/19.93
3,449,179 A * 6/1969 Minekawa et al. ..... 149/19.9
3,650,858 A 3/1972 Saylak et al.
3,834,957 A * 9/1974 McDevitt ..... 149/19.4
3,839,106 A 10/1974 De Prisque et al.
4,168,191 A * 9/1979 Benziger ..... 149/19.91
4,861,397 A * 8/1989 Hillstrom ..... 149/19.4
4,889,571 A 12/1989 Willer et al.
4,978,482 A 12/1990 Johnson et al.
4,985,094 A * 1/1991 Nahlovsky et al. ..... 149/19.92
5,041,177 A 8/1991 Hajto et al.
5,139,587 A 8/1992 Strecker et al.
5,143,566 A 9/1992 Strecker et al.
5,529,649 A * 6/1996 Lund et al. ..... 419/19.9
5,565,150 A 10/1996 Dillehay et al.
5,569,875 A 10/1996 Fey
5,587,553 A 12/1996 Braithwaite et al.
5,712,511 A * 1/1998 Chan et al. ..... 264/3.4
5,750,921 A 5/1998 Chan et al.
5,831,339 A * 11/1998 Lefumeux et al. ..... 264/3.3
5,942,722 A * 8/1999 Dawson ..... 149/92
5,949,016 A 9/1999 Baroody et al.
6,168,677 B1 * 1/2001 Warren ..... 149/19.4
6,217,799 B1 * 4/2001 Lee et al. ..... 149/19.92
6,362,311 B1 * 3/2002 Highsmith et al. ..... 528/409
6,425,966 B1 7/2002 Highsmith et al.

* cited by examiner

*Primary Examiner* — Aileen B Felton
(74) *Attorney, Agent, or Firm* — TraskBritt

(57) ABSTRACT

A method for processing explosives containing a high loading of CL-20 may advantageously include a binder system having naphthenic oil and/or paraffinic oil. Solid energetic ingredients are added into the binder system and mixed to form a free-flowing suspension in which the solid energetic ingredients are homogeneously mixed and coated with the binder system. The binder system is then cured and cast to form a cross-linked explosive.

20 Claims, No Drawings

METHOD FOR PROCESSING EXPLOSIVES CONTAINING 2,4,6,8,10,12-HEXANITRO-2,4,6,8,10,12-HEXAAZATETRACYCLO-[5.5.0.0$^{5,9}$0$^{3,11}$]-DODECANE (CL-20) WITH NAPHTHENIC AND PARAFFINIC OILS

Matter enclosed in heavy brackets [ ] appears in the original patent but forms no part of this reissue specification; matter printed in italics indicates the additions made by reissue.

CROSS-REFERENCE TO RELATED APPLICATION

This application claims the benefit of priority of U.S. Provisional Application No. 60/244,193 filed in the U.S. Patent & Trademark Office on Oct. 31, 2000, the complete disclosure of which is incorporated herein by reference.

BACKGROUND OF THE INVENTION

1. Field of the Invention

The present invention relates to the improved processing of energetic materials, in particular explosives, such as those used in warhead, munitions, and other highly energetic applications. More particularly, the method of this invention allows for the processing of explosives containing high solid loads of 2,4,6,8,10,12-hexanitro-2,4,6,8,10,12-hexaazatetracyclo[5.5.0.0.$^{5,9}$0$^{3,11}$]-dodecane (also known and referred to herein as "CL-20" and "HNIW").

2. Description of Related Art

For most existing weapons systems, one of the most critical ingredients, if not the most critical ingredient, in terms of explosive performance is the energetic filler. CL-20, with its substantial increase in performance output, is an organic oxidizing compound presenting significant opportunities in terms of energy capabilities for explosives. For example, the use of CL-20 as part of the explosive charge in weapons systems may provide, in comparison to conventional energetic fillers, increased antiarmor penetration and enhanced missile/torpedo effectiveness and lethality.

Many cast explosives are manufactured entirely in batch processes. A discussion of conventional batch processes for processing cast energetic materials is set forth in the background section of U.S. Patent No. 5,565,150. Generally, in a batch process, mixing is performed by first introducing liquid ingredients into an appropriate mixer, such as a standard vertical sigma-blade mixer, to form a plasticized binder. Examples of suitable liquid ingredients include polymeric binders, such as hydroxy-terminated polybutadiene, and plasticizers. Among the conventional plasticizers most commonly used with hydroxy-terminated polybutadiene are dioctyladipate (DOA) and isodecyl pelargonate (IDP). After the liquid ingredients have been mixed thoroughly, the solid ingredients are added in a multistep fashion, with an equal proportion typically being added in each step. Because of the high performance expected of modem explosive devices, cast explosive compositions typically contain high solid contents on the order of about 85 wt % to 92 wt %. Examples of solid ingredients include the following: organic energetic fillers such as RDX (1,3,5-trinitro-1,3,5-triazacyclohexane), HMX (1,3,5,7-tetranitro-1,3,5,7-tetraazacyclooctane); inorganic oxidizers, such as ammonium nitrate, ammonium dinitramide, and ammonium perchlorate; and metal fuels, such as aluminum powder. Once the solid ingredients have been blended into the plasticized binder to achieve homogeneity, a curative (e.g., a diisocyanate) and a cure catalyst (e.g., triphenyl bismuth) are added to cure the plasticized binder. Prior to full cure, the mixture is cast, for example, into the case of a warhead or suitable mold.

When an effective amount of plasticizer is used in combination with RDX or HMX as the energetic filler, the solid ingredients are wetted and coated and the mixture takes on a sufficiently low viscosity to create a relatively free-flowing suspension that is castable without too much difficulty. Generally, it is possible to employ an effective amount of plasticizer to establish a free-flowing suspension without causing the plasticizer to exude from the cast explosive.

However, the inventor has found that the conventional plasticizers used for batch mixing do not create a free-flowing suspension when mixed with high solid loads of CL-20. Although CL-20 shares an association with RDX and HMX inasmuch as each of these compounds is categorized as a nitramine, in the context of this conventional processing technique, CL-20 does not share the same synergistic compatibility with conventional plasticizers as RDX or HMX. The addition of high proportions of CL-20 to conventional plasticized binders, such as hydroxy-terminated polybutadiene plasticized in DOA or IDP, produces a high viscosity formulation having poor flowability. As a consequence, expensive processing equipment and high power expenditures are required for stirring large batches of castable explosive compositions containing high CL-20 loads to create the shear forces needed to homogenize the composition. Even with high shear mixing equipment, it is often only possible to attain marginal homogeneity in the cast material. It is also difficult to cast the high viscosity explosive without generating air pockets in the cast explosive. The presence of air pockets in cast explosives is highly undesirable, since air pockets increase impact sensitivity and decrease performance. Attempts to lower the viscosity of the mixture and attain homogeneity in mixing by the addition of high proportions of plasticizer have also been unsuccessful. The amount of plasticizer needed to homogeneously disperse CL-20 loads in conventional plasticized binders and create a free-flowing casting mixture is typically so great that the plasticizer exudes from the cast explosive material. The exuding of plasticizer from the cast explosive material can cause the material to shrink and separate from its surrounding case.

SUMMARY OF THE INVENTION

[It is, therefore, an object of this] *This* invention [to fulfill] *fulfills* a long-standing need in the art by providing a technique in which an explosive composition characterized by a high solid content, including a high proportion of CL-20 as one of the solid ingredients, can be processed without encountering the above-discussed problems of high viscosity, poor castability, and plasticizer exudation.

In accordance with the principles of this invention, the above and other [objects] *advantages* are attained by a method of processing explosives in which at least one plasticizer selected from the group consisting of naphthenic oil and paraffinic oil is mixed with at least one binder that is miscible with the naphthenic/paraffinic oil. The plasticized binder is then combined with solid energetic ingredients, in particular CL-20, and optionally other solid ingredients, such as other energetic fillers, metal fuels, oxidizers, and fillers. The solid ingredients content of the explosive composition is preferably high, meaning that the total amount of polymeric binder and processing oil remaining in the cast explosive material is not more than about 15% by weight. Preferably, the solid ingredients content of the explosive material is in the range of about 85 wt % to about 92 wt %, more preferably 86 wt % to 91 wt %. As referred to herein, solid ingredients means ingredients that are in a solid state at room temperature, and exclude the polymeric binder and the plasticizing processing oils.

Unlike conventional plasticizers, when CL-20 is mixed in a binder plasticized with a sufficient amount of processing oils, the resulting explosive composition has a sufficiently low viscosity to allow for homogeneous mixing of the solid ingredients in the plasticized binder and to establish, prior to curing of the composition, a relatively free-flowing suspension that can be cast into a desired configuration without the formation of air pockets.

Other [objects,] aspects and advantages of the invention will be apparent to those skilled in the art upon reading the specification and appended claims which explain the principles of this invention.

DETAILED DESCRIPTION OF PREFERRED EMBODIMENTS AND PREFERRED METHODS

The method of the present invention produces cast explosives without the need to rely on solvents and high-shear mixing equipment. Instead, the introduction of an effective amount of naphthenic oil and/or paraffinic oil as a plasticizer in accordance with the practice of this invention permits explosive compositions containing high solid ingredients contents to be processed at sufficiently low viscosities to establish free-flowing suspensions.

In accordance with this method, a binder system is prepared by introducing at least one liquid binder and at least one plasticizer comprising naphthenic oil and/or paraffinic oil into a mixer and intimately mixing the binder and plasticizer with each other to form a homogeneous miscible solution. As the filler is added, the viscosity of the mixture increases. Preferably, a multimodal distribution of nitramine particles, in particular a bimodal or trimodal distribution, is used to improve mix viscosity. It is also preferable to add the solid ingredients via a multistep technique. The invention is not limited to this preferred technique; rather, the solid ingredients may be added in a continuous fashion or in one shot. After mixing to homogeneity, the composition is cast into a mold or container and allowed to cross-link and solidify into the desired shape. In order to establish curing, a curative and, optionally, a cure catalyst are added during processing. Although the curative and cure catalyst are preferably (but not necessarily) added last, the cure catalyst may be added into the binder system prior to the addition of the solid ingredients.

Examples of suitable mixers for blending the binder system with the solid ingredients under low-shear conditions include a vertical sigma-blade mixer and, in the case of a continuous process, a twin-screw extruder, although these examples are not intended to be exhaustive of the types of apparatuses that may be used to practice the method of this invention. Mixing is generally performed in a temperature range of about room temperature to about 65° C., since mixing above about 70° C. can cause premature curing of the composition. Preferably, mixing is performed at about 45° C. to about 60° C. to lower the mix viscosity, and subsequent cure is performed at 45° C. to 70° C., preferably about 57° C.

Typical formulations for cast explosive compositions include at least 85 wt % solid ingredients, although more commonly the concentration of solid ingredients for cast explosive composition is in a range of about 86 wt % to about 91 wt % of solid loads, based on the total weight of the dry explosive. Lower than about 85 wt % solid loads can impede homogeneous distribution of the solid ingredients, especially when large coarse loads are used. Practicing higher than about 91 wt % solid loads can interfere with mix efficiency due to high viscosities that accompany high solid loading.

Although the amount of nitramine in the explosive composition is dependent upon the intended use of the explosive, the nitramine energetic filler is usually present in the highest concentration than any other single ingredient in the explosive composition. Generally, from 30 wt % to 91 wt % of the total weight of the dry explosive composition is comprised of nitramines. The minimum amount of nitramines used in the explosive composition generally depends upon the intended application of the explosive. For example, high detonation pressure explosives may have nitramine concentrations of about 86 wt % to 91 wt % based on the total dry weight of the explosive composition, whereas fragment-accelerating explosives and blast explosives contain oxidizers and metals that reduce the overall concentration of nitramines to as low as about 30 wt %.

Although CL-20 is contemplated as the nitramine of choice for this invention, it is also within the scope of this invention to use CL-20 in combination with other energetic fillers, including other nitramines. Exemplary nitramines suitable for the energetic composition of this invention include TEX (4,10-dinitro-2,6,8,12-tetraoxa-4,10-diazatetracyclo-5.5.0.0$^{5,9}$0$^{3,11}$-dodecane), RDX (1,3,5-trinitro-1,3,5-triazacyclohexane), and/or HMX (1,3,5,7-tetranitro-1,3,5,7-tetraaza-cyclooctane). Preferably, at least 30% by weight to 91% by weight, more preferably 86% by weight to 91% by weight, of the total dry explosive composition comprises CL-20 as the nitramine, since the processing oil used in this invention is specifically designed for overcoming problems that conventional processes have in homogeneously mixing CL-20 into a curable plasticized binder and casting the mixture.

Although it is possible, and in some cases preferred, for the energetic filler to exclusively consist of either CL-20 alone or CL-20 in combination with TEX, HMX, and/or RDX, other solid ingredients may optionally be used with these nitramines. A nonexhaustive list of suitable optional solid ingredients includes other energetic fillers, oxidizers, metals, and reinforcing particles or fibers. Representative energetic fillers include NTO (3-nitro-1,2,4-triazol-5-one), NQ (nitroguanidine), TATB (1,3,5-triamino-2,4,6-trinitrobenzene), and DADNE (1,1-diamino-2,2-dinitro ethane). Representative oxidizers suitable for nonaqueous processing include AP (ammonium perchlorate), AN (ammonium nitrate), HAN (hydroxylammonium nitrate), ADN (ammonium dinitramide), HNF (hydrazinium nitroformate) or mixtures thereof. Representative reactive metals include aluminum. The metals and oxidizer may be present as a powder, particles, and/or in other forms. Those skilled in the art will appreciate that other known and novel solid ingredients suitable for explosive compositions and not listed above may also be used in the present invention.

The plasticizer—i.e., the naphthenic oil and/or paraffinic oil—and the binder comprise not more than about 15% by weight of the total weight of the dry explosive composition, more preferably 9% by weight to 14% by weight of the total dry weight of the explosive composition. The plasticizer-to-binder weight ratio is preferably about 1:1. The amount of plasticizer may exceed this preferred weight ratio, so long as controlled to not exude the plasticizer from the cast explosive. Likewise, the amount of binder may be increased above the 1:1 weight ratio, so long as the viscosity of the explosive composition is not raised too high. Generally, the Brookfield viscosity of the explosive composition prior to cure is no higher than 30 kilopoise (kp) at processing temperatures.

The terms "naphthenic oil" and "paraffinic oil" are often used interchangeably, since these processing oils typically include paraffins, cycloparaffins, and aromatic components. Naphthenic and paraffinic oils are refined products of crude petroleum. Representative naphthenic oils include, by example and not exclusive of the scope of this invention, STAN PLAS oils, whereas examples of paraffinic oils include SUNPAR.

The presence of the processing oil in accordance with the teaching of this invention obviates the need to use a conventional plasticizer for improving processability. However, it is within the scope of this invention to use one or more conventional plasticizers in combination with the processing oil in order to tailor the physical properties of the cast explosive material. Representative inert plasticizers include DOA (dioctyladipate), IDP (isodecylperlargonate), DOP (dioctylphthalate), DOM (dioctylmaleate), DBP (dibutylphthalate), or mixtures thereof. The substitution of one of these conventional plasticizers for either naphthenic processing oil or paraffinic processing oil will generally raise the viscosity of the castable explosive composition, requiring the weight ratio of plasticizer-to-binder to be raised.

Suitable binders include those miscible with the processing oil and suitable for casting. Preferred binders include one or more members selected from the group consisting of hydroxy-functional polydiolefin [prepolymers] *prepolymers*, such as HTPB (hydroxy-terminated polybutadiene) and hydroxy-terminated polyisoprene; and carboxy-functional polydiolefin prepolymers, such as CTPB (carboxy-terminated polybutadiene) (available from Morton). Also suitable for the invention is poly (butadiene-co-acrylonitrile-co-acrylic acid) (available from American Synthetic Rubber). Polyacrylates and polymethacrylates reacted with small amounts of a comonomer (e.g., acrylic acid) may be practiced. Suitable polyacrylates that are miscible with the processing oil include poly(hexylacrylate) and poly(ethylhexylacrylate) and their copolymers; the methacrylate analogs to hexyl- and 2-ethylhexylacrylate may also be used. Suitable inert polyoxetanes miscible with the processing oil include poly(dimethyloxetane) and poly(diethyloxetane), or mixtures and copolymers thereof. Halogenated binders may also be used, including, for example, VITON® (vinylidenefluoride-co-tetrafluoroethylene-co-hexafluoropropylene or vinylidenefluoride-co-tetrafluoroethylene-co-perfluoro(methylvinylether)) and KEL-F® (vinylidenefluoride-co-chlorotrifluoroethylene).

Small amounts of surfactants, such as lecithin, facilitate the adhesion of the binder system to the surfaces of the filler ingredients.

Generally, curatives are added in an amount of from about 0.5 wt % to about 3 wt %, and one or more cure catalysts are added in an amount of from about 0.01 wt % to about 2 wt %. Exemplary curatives for the hydroxy-multifunctional polydiolefin prepolymers and carboxy-functional polydiolefin prepolymers are chain-extending diisocyanates, such as isophoronediisocyanate (IDPI), dimeryldiisocyanate (DDI), toluene diisocyanate (TDI), and tetramethylxylene diisocyanate (TMXDI), although it is within the scope of this invention to use polyisocyanates. The carboxy-functional polydiolefin prepolymers can also be cured with aziridine compounds, for example. Epoxy curatives are suitable for curing the polyacrylates. Exemplary cure catalysts include Lewis acids, triphenylbismuth, and alkyltin compounds, such as dibutyltindiluarate.

Various forms of munitions, ordnances, warheads, and other explosive devices may be used in connection with this invention. Generally, munitions and ordnances comprise an explosive fill, an outer case (optionally capable of fragmentation into shrapnel), optionally a liner (typically metal), a fuse system, and a detonator. Preparation of such explosive devices is within the purview of those skilled in the art and can be practiced with the explosives of this invention without undue experimentation.

Advantages of this process include improved homogeneity in the explosive material, enhanced processability during mixing and casting, and lower production costs. The improved homogeneity is attributable to the lower viscosity of the uncured energetic composition. The lower viscosity permits for more thorough blending, especially when solid ingredient addition is performed in a multistep fashion. It will also be appreciated that the lower viscosity imparts greater flowability to the suspension of CL-20 in the binder system, thereby allowing the suspension to be cast into various configurations. Lower production costs arise by circumventing the need for high-shear mixing equipment.

Set forth below are examples of several embodiments of this invention. These examples are intended to be representative, not exhaustive, of the scope of the invention.

EXAMPLES

Example 1

A binder system was prepared by combining 5.27 grams of hydroxy-terminated polybutadiene (trade name R-45M), 5.69 grams of STAN PLAS 100, 0.60 grams of lecithin, and 0.01 grams of triphenylbismuth into a mixture warmed to 26.7° C. (80° F.) and mixing by hand until homogeneous. Then, 18.25 grams of coarse CL-20 (and 4 grams of methylene chloride) were added to the mixer and mixed for five minutes to homogeneity. The remaining 18.25 grams of coarse CL-20 (and 4 grams of methylene chloride) were then added and mixed for 10 minutes into the binder system to reach homogeneity. Next, 36.50 grams of the 11 micron CL-20 were added in two steps, with an equal amount of 18.25 grams (and 4 grams of methylene chloride) being added in each step and mixing being performed for 10 minutes after each of the steps. 15 grams of 2 micron CL-20 and 0.43 grams of isophorone diisocyanate (IDPI) (and 4 grams of methylene chloride) were then added and mixed for 5 minutes. The temperature of the mixture was then raised to 60° C. (140° F.). Mixing was continued for 35 minutes under vacuum to remove the methylene chloride solvent. Samples were then cast onto mixing sheets. Viscosity is reported at about 60° C. (140° F.).

Comparative Examples A and B

The procedure of Example 1 was repeated for each of Comparative Examples A and B, except that 5.69 grams of IDP were substituted for the STAN PLAS in Comparative Example A and 5.69 grams of DOA were substituted for the STAN PLAS in Comparative Example B. The reported viscosities are at about 60° C. (140° F.).

TABLE 1

| | Example 1 | Comparative Example A | Comparative Example B |
|---|---|---|---|
| Hydroxy-terminated polybutadiene | 5.27 | 5.27 | 5.27 |
| Lecithin | 0.6 | 0.6 | 0.6 |
| IPDI | 0.43 | 0.43 | 0.43 |
| Triphenylbismuth | 0.01 | 0.01 | 0.01 |

TABLE 1-continued

| | Example 1 | Comparative Example A | Comparative Example B |
|---|---|---|---|
| STAN PLAS 100 | 5.69 | — | — |
| IDP | — | 5.69 | — |
| DOA | — | — | 5.69 |
| CL-20 (coarse) | 36.50 | 36.50 | 36.50 |
| CL-20 (11 micron) | 36.50 | 36.50 | 36.50 |
| CL-20 (2 micron) | 15.00 | 15.00 | 15.00 |
| End of Mix Viscosity | 2.4 kp | 41 kp | 96 kp |

all parts are by weight percentage.

From Table 1, it is seen that Example 1, containing CL-20 with a naphthenic processing oil plasticizer, has a much lower viscosity than Comparative Examples A and B, which used conventional IDP and DOA plasticizers.

Example 2

A binder system was prepared by combining 3.95 grams of hydroxy-terminated polybutadiene (trade name R-45M), 4.27 grams of STAN PLAS 300, 0.45 grams of lecithin, and 0.01 grams of triphenylbismuth into a mixture warmed to 60° C. (140° F.) and mixing by hand until homogeneous. Then, 13.69 grams of coarse CL-20 were added to the mixer and mixed for ten minutes to homogeneity. The remaining 13.69 grams of coarse CL-20 were then added and homogeneously mixed for 15 minutes into the binder system. Next, 13.69 grams of the 11 micron CL-20 were added, mixed for 15 minutes, and allowed to stand for 1 hour. Then, the remaining 13.69 grams of the 11 micron CL-20 were added and mixed for 15 minutes. 11.25 grams of 2 micron CL-20 were then added and mixed for 20 minutes, followed by the addition of 0.32 grams of isophorone diisocyanate (IDPI). Mixing was continued for 20 minutes under vacuum. Samples were then cast onto mixing sheets.

Examples 3 and 4

The procedure of Example 2 was repeated for each of Examples 3 and 4, except that 4.27 grams of STAN PLAS 500 were substituted for the STAN PLAS 300 in Example 3 and 4.27 grams of STAN PLAS 1200 were substituted for the STAN PLAS 300 in Example 4.

Comparative Example C

The procedure of Example 2 was repeated for Comparative Example C, except that 4.25 grams of IDP were substituted for the STAN PLAS 300.

TABLE 2

| | Example 2 | Example 3 | Example 4 | Comparative Example C |
|---|---|---|---|---|
| Hydroxy-terminated polybutadiene | 5.27 | 5.27 | 5.27 | 5.27 |
| Lecithin | 0.6 | 0.6 | 0.6 | 0.6 |
| IPDI | 0.43 | 0.43 | 0.43 | 0.43 |
| Triphenylbismuth | 0.01 | 0.01 | | 0.01 |
| STAN PLAS 300 | 5.69 | — | — | — |
| STAN PLAS 500 | — | 5.69 | — | — |
| STAN PLAS 1200 | — | — | 5.69 | — |
| IDP | — | — | — | 5.66 |
| CL-20 (coarse) | 36.50 | 36.50 | | 36.50 |
| CL-20 (11 micron) | 36.50 | 36.50 | | 36.50 |
| CL-20 (2 micron) | 15.00 | 15.00 | | 15.00 |

TABLE 2-continued

| | Example 2 | Example 3 | Example 4 | Comparative Example C |
|---|---|---|---|---|
| End of Mix Viscosity | 3.2 kp at 58.8° C. | 3.8 kp at 59.3° C. | 5.0 kp at 59.5° C. | 35 kp at 59.5° C. |

all parts are by weight percentage.

From Table 2, it is seen that the excellent viscosity enhancement produced by STAN PLAS 100 in Example 1 is likewise produced by the naphthenic oils STAN PLAS 300, STAN PLAS 500, and STAN PLAS 1200.

Example 5

A binder system was prepared by combining 3.95 grams of hydroxy-terminated polybutadiene (trade name R-45M), 1.88 grams of STAN PLAS 100, 2.39 grams of IDP, 0.45 grams of lecithin, and 0.02 grams of triphenylbismuth into a mixture warmed to 60° C. (140° F.) and mixing by hand until homogeneous. Then, 13.69 grams of coarse CL-20 were added to the mixer and mixed for 10 minutes to homogeneity. Another 13.69 grams of coarse CL-20 were then added and homogeneously mixed for 15 minutes into the binder system. Next, 13.69 grams of the 11 micron CL-20 were added, mixed for 15 minutes, and allowed to stand for 1 hour. Then, the remaining 13.69 grams of the [II] *11* micron CL-20 were added and mixed for 15 minutes. 11.25 grams of 2 micron CL-20 were then added and mixed for 20 minutes, followed by the addition of 0.32 grams of isophorone diisocyanate (IDPI). Mixing was continued for 20 minutes under vacuum. Samples were then cast onto mixing sheets.

Example 6

The procedure of Example 5 was repeated for Example 6, except that 1.88 grams of STAN PLAS 500 were substituted for the STAN PLAS 100 of Example 5.

Example 7

The procedure of Example 5 was repeated for Example 7, except that the amount of STAN PLAS 100 was lowered to 0.75 grams and the amount of IDP was raised to 3.51 grams.

Example 8

The procedure of Example 7 was repeated for Example 8, except that 0.75 grams of STAN PLAS 500 were substituted for the STAN PLAS 100 of Example 7.

TABLE 3

| | Example 5 | Example 6 | Example 7 | Example 8 |
|---|---|---|---|---|
| Hydroxy-terminated polybutadiene | 5.27 | 5.27 | 5.27 | 5.27 |
| Lecithin | 0.60 | 0.60 | 0.60 | 0.60 |
| IPDI | 0.43 | 0.43 | 0.43 | 0.43 |
| Triphenylbismuth | 0.02 | 0.02 | 0.02 | 0.02 |
| STAN PLAS 100 | 2.50 | — | 1.00 | — |
| STAN PLAS 500 | — | 2.50 | — | 1.00 |
| IDP | 3.18 | 3.18 | 4.68 | 4.68 |
| CL-20 (coarse) | 36.50 | 36.50 | 36.50 | 36.50 |
| CL-20 (11 micron) | 36.50 | 36.50 | 36.50 | 36.50 |
| CL-20 (2 micron) | 15.00 | 15.00 | 15.00 | 15.00 |
| End of Mix Viscosity | 16.0 kp at 58.2° C. | 13.1 kp at 58.6° C. | 25.4 kp at 58.8° C. | 28.4 kp at 58.8° C. |

all parts are by weight percentage.

A comparison of Examples 5 and 7, as well as a comparison of Examples 6 and 8, show that decreasing the ratio of processing oil-to-IDP adversely increases mix viscosity.

Example 9 and Comparative Examples D-I

TABLE 4

| | Example | Comparative Examples | | | | | |
|---|---|---|---|---|---|---|---|
| | 9 | D | E | F | G | H | I |
| Hydroxy-terminated poly-butadiene | 6.3 | 6.3 | 6.3 | 6.58 | 6.58 | 6.31 | 6.31 |
| STAN PLAS | 5.70 | — | — | 5.42 | — | 5.69 | — |
| LDP | — | 5.70 | — | — | 5.42 | — | 5.69 |
| DOA | — | — | 5.70 | — | — | — | — |
| CL-20 | 88.00 | 88.00 | 88.00 | | | | |
| HMX | | | | 88.00 | 88.00 | | |
| RDX | | | | | | 88.00 | 88.00 |
| Viscosity | 2.4 kp | 41 kp | 96 kp | 29 kp | 40 kp | 12 kp | 18 kp |

all parts are by weight percentage.

A comparison of Example 9 against Comparative Examples D and E demonstrates the viscosity-lowering effect that STAN PLAS naphthenic oil has with CL-20 compositions. Compared to CL-20-loaded compositions having IDP and DOA plasticizers, Example 9 showed a decrease in viscosity of 94.1% ((41 kp-2.4 kp)/41 kp) and 97.5% ((96 kp-2.4 kp)/96 kp), respectively.

On the other hand, the STAN PLAS naphthenic oil did not have as profound an effect with compositions loaded with either HMX or RDX. For HMX-loaded compositions F and G, the use of STAN PLAS naphthenic oil (Comparative Example F) instead of IDP (Comparative Example G) decreased the viscosity only 27.5% ((40 kp-29 kp)/40 kp). For RDX-loaded compositions H and I, the use of STAN PLAS naphthenic oil (Comparative Example H) instead of IDP (Comparative Example I) decreased the viscosity only 33% ((18 kp-12 kp)/18 kp) compared to IDP.

Examples 10-12

Examples 10-12 demonstrate that the superior viscosity-enhancing effect of the present invention can also be found in high solid loads of 90% by weight.

TABLE 5

| | Example 10 | Example 11 | Example 12 |
|---|---|---|---|
| Hydroxy-terminated polybutadiene | 4.39 | 4.39 | 4.39 |
| Lecithin | 0.5 | 0.5 | 0.5 |
| IPDI | 0.36 | 0.36 | 0.36 |
| Triphenylbismuth | 0.01 | 0.01 | 0.01 |
| STAN PLAS 100 | 4.74 | 4.74 | 4.74 |
| CL-20 (coarse) | 37.30 | 35.30 | 35.30 |
| CL-20 (11 micron) | 37.30 | 37.30 | 37.30 |
| CL-20 (2 micron) | 15.40 | 17.40 | 17.40 |
| End of Mix Viscosity | 11.4 kp | 15.5 kp | 11.8 kp |

all parts are by weight percentage.

The foregoing detailed description of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A method for processing an explosive composition, comprising:

mixing a binder system comprising at least one liquid polymeric binder and at least one processing oil selected from the group consisting of naphthenic oil and paraffinic oil;

adding solid energetic ingredients into the binder system, the solid energetic ingredients comprising 2,4,6,8,10,12-hexanitro-2,4,6,8,10,12-hexaazatetracyclo [5.5.0.0$^{5,9}$ 0$^{3,11}$]-dodecane (CL-20); [and]

mixing the binder system and the solid energetic ingredients at a temperature *within a range of* from about room temperature to about 65° C. to form a free-flowing suspension in which the solid energetic ingredients are homogeneously mixed and coated with the binder [system, the solid energetic ingredients comprising at least 30% by weight of the explosive composition] *system; and*

*casting the free-flowing suspension*.

2. The method according to claim 1, wherein mixing a binder system comprising at least one liquid polymeric binder and at least one processing oil comprises selecting the polymeric binder and the at least one processing oil to be miscible in each other.

3. The method according to claim 1, wherein mixing the binder system and the solid energetic ingredients at a temperature *within a range of* from about room temperature to about 65° C. to form a free-flowing suspension comprises mixing the binder system and the solid energetic ingredients to form [the] *a* free-flowing suspension having a Brookfield viscosity of no more than 30 kilopoise at a temperature of about 60° C.

4. The method according to claim 1, wherein mixing a binder system comprising at least one liquid polymeric binder and at least one processing oil comprises mixing the at least one liquid polymeric binder and naphthenic oil.

5. The method according to claim 1, wherein mixing a binder system comprising at least one liquid polymeric binder and at least one processing oil comprises mixing the at least one liquid polymeric binder and paraffinic oil.

6. A method for processing an explosive composition, comprising:

mixing a binder system comprising at least one liquid polymeric binder and at least one processing oil selected from the group consisting of naphthenic oil and paraffinic oil;

adding solid energetic ingredients into the binder system at a temperature *within a range of* from about room temperature to about 65° C., the solid energetic ingredients comprising 2,4,6,8,10,12-hexanitro-2,4,6,8,10,12-hexaazatetracyclo[5.5.0.0.$^{5,9}$0$^{3,11}$]-dodecane (CL-20);

mixing the binder system and the solid energetic ingredients to form a free-flowing suspension in which the solid energetic ingredients are homogeneously mixed and coated with the binder system;

initiating cure of the at least one liquid polymeric binder in the free-flowing suspension with at least one curative [and optionally] *and, optionally,* at least one cure catalyst;

casting the free-flowing suspension; and establishing cure of the free-flowing suspension to form the explosive [composition, wherein the solid energetic ingredients comprise at least about 85% by weight of the explosive] composition.

7. The method according to claim 6, wherein mixing a binder system comprising at least one liquid polymeric binder and at least one processing oil comprises selecting the polymeric binder and the at least one processing oil to be miscible in each other.

8. The method according to claim 6, wherein mixing the binder system and the solid energetic ingredients to form a free-flowing suspension in which the solid energetic ingredients are homogeneously mixed and coated with the binder system comprises mixing the binder system and the solid energetic ingredients to form [the] *a* free-flowing suspension having a Brookfield viscosity of no more than 30 kilopoise at a temperature of about 60° C.

9. The method according to claim 6, wherein mixing a binder system comprising at least one liquid polymeric binder and at least one processing oil comprises mixing the at least one liquid polymeric binder and naphthenic oil.

10. The method according to claim 6, wherein mixing a binder system comprising at least one liquid polymeric binder and at least one processing oil comprises mixing the at least one liquid polymeric binder and paraffinic oil.

11. The method according to claim 6, wherein the solid energetic ingredients comprise from *about* 86% by weight to *about* 91% by weight of the explosive composition.

12. The method according to claim 6, wherein the CL-20 comprises *from* about 86% by weight to about 91% by weight of the explosive composition.

13. The method according to claim 6, wherein the solid energetic ingredients further comprise at least one nitramine selected from the group consisting of TEX (4,10-dinitro-2,6,8,12-tetraoxa-4,10-diazatetracyclo-[5.5.0.0.$^{5,9}$0$^{3,11}$]-dodecane), RDX (1,3,5-trinitro-1,3,5-triaza-cyclohexane), and HMX (1,3,5,7-tetranitro-1,3,5,7-tetraaza-cycloocatane).

14. The method of claim 1, wherein mixing a binder system comprising at least one liquid polymeric binder and at least one processing oil comprises mixing the at least one liquid polymeric binder and the at least one processing oil at a ratio of substantially 1:1.

15. The method of claim 1, wherein adding [the] solid energetic ingredients into the binder system comprises adding greater than approximately 85% by weight of the solid energetic ingredients into the explosive composition.

16. The method of claim 1, wherein adding [the] solid energetic ingredients into the binder system comprises adding from approximately 86% by weight to approximately 91% by weight of the solid energetic ingredients into the explosive composition.

17. The method of claim 1, wherein mixing the binder system and the solid energetic ingredients at a temperature *within a range of* from about room temperature to about 65° C. to form a free-flowing suspension comprises mixing the binder system and the solid energetic ingredients without solvents.

*18. The method of claim 1, wherein the solid energetic ingredients comprise at least 30% by weight of the explosive composition.*

*19. The method of claim 6, wherein the solid energetic ingredients comprise at least about 85% by weight of the explosive composition.*

*20. A method for processing an explosive composition, comprising:*

*mixing a binder system comprising at least one liquid polymeric binder selected from the group consisting of hydroxy-terminated polybutadiene, carboxy-terminated polybutadiene, and poly(butadiene-co-acrylonitrile-co-acrylic acid) and at least one processing oil selected from the group consisting of naphthenic oil and paraffinic oil;*

*adding solid energetic ingredients into the binder system, the solid energetic ingredients comprising 2,4,6,8,10,12-hexanitro-2,4,6,8,10,12-hexaazatetracyclo [5.5.0.0.$^{5,9}$0$^{3,11}$]-dodecane (CL-20);*

*mixing the binder system and the solid energetic ingredients at a temperature within a range of from about 45° C. to about 65° C. to form a free-flowing suspension in which the solid energetic ingredients are homogeneously mixed and coated with the binder system; and*

*casting the free-flowing suspension.*

* * * * *